(12) United States Patent
Kim et al.

(10) Patent No.: US 12,732,064 B2
(45) Date of Patent: Sep. 8, 2026

(54) HIGH-EFFICIENCY SELF-GENERATOR

(71) Applicant: SAMNAM INC., Gangneung-si (KR)

(72) Inventors: Sung Joon Kim, Gyeongju-si (KR); Tae Heon Kim, Gyeongju-si (KR)

(73) Assignee: SAMNAM INC., Gangneung-si (KR)

( * ) Notice: Subject to any disclaimer, the term of this patent is extended or adjusted under 35 U.S.C. 154(b) by 284 days.

(21) Appl. No.: 18/698,797

(22) PCT Filed: Aug. 2, 2023

(86) PCT No.: PCT/KR2023/011307
§ 371 (c)(1),
(2) Date: Apr. 5, 2024

(87) PCT Pub. No.: WO2024/106687
PCT Pub. Date: May 23, 2024

(65) Prior Publication Data

US 2025/0239914 A1 Jul. 24, 2025

(30) Foreign Application Priority Data

Nov. 17, 2022 (KR) ........................ 10-2022-0154593
Jul. 26, 2023 (KR) ........................ 10-2023-0097673

(51) Int. Cl.
*H02K 7/18* (2006.01)
*H02K 7/07* (2006.01)
*H02K 7/116* (2006.01)

(52) U.S. Cl.
CPC ............ *H02K 7/1853* (2013.01); *H02K 7/07* (2013.01); *H02K 7/116* (2013.01)

(58) Field of Classification Search
CPC . F03G 1/02; H02K 53/00; H02K 7/07; H02K 7/10; H02K 7/116; H02K 7/118; H02K 7/18; H02K 7/1853; H02K 7/1861
See application file for complete search history.

(56) References Cited

U.S. PATENT DOCUMENTS

2019/0339649 A1* 11/2019 Zhou ...................... F03G 5/062
2022/0306239 A1* 9/2022 Chan ........................ B62M 6/50

FOREIGN PATENT DOCUMENTS

CN 209336601 U * 9/2019 ............ H02K 7/116
CN 113922584 A * 1/2022 ............ H02K 7/085

(Continued)

OTHER PUBLICATIONS

Translation for CN113922584 (Year: 2022).*

(Continued)

*Primary Examiner* — Christopher M Koehler
*Assistant Examiner* — Ethan Nguyen Vo
(74) *Attorney, Agent, or Firm* — Revolution IP, PLLC

(57) ABSTRACT

A high-efficiency self-generator includes a rotating body assembly including an outer rotor that is formed to be rotatable with a first central axis as a center point and a plurality of inner rotors, a power generation device that is connected to the outer rotor and generates electricity by rotation of the outer rotor, a pedal device configured to convert an external force generated by a user into a rotational driving force, a gear device configured to rotate the inner rotors, a reduction device configured to change a power transmission ratio between the pedal device and the gear device, a starting device configured to rotate the outer rotor by transmitting the rotational driving force generated by the pedal device to the outer rotor, and a gear control device configured to intermittently rotate the inner rotor.

7 Claims, 15 Drawing Sheets

(56) References Cited

FOREIGN PATENT DOCUMENTS

| | | | | | |
|---|---|---|---|---|---|
| CN | 217216137 | U | * | 8/2022 | H02K 1/30 |
| CN | 115149769 | A | * | 10/2022 | H02K 1/276 |
| JP | 2016-025835 | A | | 2/2016 | |
| KR | 200395944 | Y1 | * | 9/2005 | F16H 1/20 |
| KR | 10-2010-0086214 | A | | 7/2010 | |
| KR | 101700520 | B1 | * | 1/2017 | H02K 13/003 |
| KR | 10-2022-0021196 | A | | 2/2022 | |
| KR | 10-2022-0059385 | A | | 5/2022 | |
| KR | 20220059385 | A | * | 5/2022 | H02K 7/20 |
| KR | 20220099881 | A | * | 7/2022 | H02K 99/20 |

OTHER PUBLICATIONS

Translation for CN115149769 (Year: 2022).*
Translation for CN209336601 (Year: 2019).*
Translation for CN217216137 (Year: 2022).*
Translation for KR200395944Y (Year: 2005).*
Translation for KR20220059385 (Year: 2022).*
Translation for KR20220099881 (Year: 2022).*
International Search Report of PCT/KR2023/011307 mailed Nov. 2, 2023.

* cited by examiner

HIGH-EFFICIENCY SELF-GENERATOR

TECHNICAL FIELD

The present invention relates to a high-efficiency self-generator, and more specifically, to a high-efficiency self-generator including various components organically connected to each other to form a power transmission structure, capable of performing high-efficiency power generation by increasing a rotational acceleration of an outer rotor for generating electricity in a power generation device.

BACKGROUND ART

In modern times, the importance of electrical energy is very high, and methods for generating electrical energy with high efficiency are continuously being researched and developed.

Accordingly, there are various power generation methods in addition to traditional power generation methods such as thermal power generation, water power generation, and nuclear power generation, as well as eco-friendly power generation methods such as wind power generation and solar power generation, and one of the various power generation methods is a mainspring-type generator that generates electricity using a mainspring, and a magnet-type generator that assists in producing electricity using permanent magnets.

However, in the case of the mainspring-type generator, as the number of gears transmitted to a rotor of the generator increases, the time for rotating the rotor of the generator itself may be increased, but there is a problem in that a rotational force increasingly becomes weaker and thus power generation efficiency significantly drops.

In addition, in the magnet-type generator, by using a method in which the magnetic force of the permanent magnets assists rotation of a rotor and and gears are utilized, the number of rotations may be increased, but like the mainspring-type generator, there is a problem in that the rotational force is weak and the time it takes to generate electricity is short, so that the efficiency is very low.

DISCLOSURE

Technical Problem

The present invention has been made to solve the problems of the related art described above, and is directed to providing a high-efficiency self-generator capable of effectively improving a weak rotational force and low electricity generation efficiency, which are disadvantages of a mainspring-type generator and a magnetic-type generator in the related art.

Problems to be solved by the present invention are not limited to those mentioned above, and other problems not mentioned will be clearly understood by those skilled in the art from the following description.

Technical Solution

One aspect of the present invention provides a high-efficiency self-generator including a rotating body assembly including an outer rotor that is formed to be rotatable with a first central axis as a center point and a plurality of inner rotors that are formed to be rotatable with a second central axis positioned between the first central axis and the outer rotor as a center point, a power generation device that is connected to the outer rotor and generates electricity by rotation of the outer rotor, a pedal device configured to convert an external force generated by a user into a rotational driving force, a gear device configured to rotate the inner rotors by transmitting the rotational driving force generated by the pedal device to the inner rotors, a reduction device configured to change a power transmission ratio between the pedal device and the gear device, a starting device configured to rotate the outer rotor by transmitting the rotational driving force generated by the pedal device to the outer rotor, and a gear control device configured to intermittently rotate the inner rotor by periodically intermitting driving of the gear device.

In this case, the outer rotor may include a first permanent magnet array including a plurality of first permanent magnets arranged along an arc trajectory with a first diameter with the first central axis as a center point, and the inner rotor may include a second permanent magnet array including a plurality of second permanent magnets arranged along a circular trajectory with a second diameter smaller than the first diameter with the second central axis as a center point.

Here, the first permanent magnet array may be formed such that the first permanent magnets are arranged so that a polarity of each first permanent magnet is in the same direction as that of another adjacent first permanent magnet and a magnitude of a relative magnetic force exerted on the second permanent magnet gradually increases in a direction opposite to a rotational direction of the outer rotor, and the second permanent magnet array may be formed such that the second permanent magnets are alternately arranged so that a polarity of each second permanent magnet is in a direction opposite to that of another adjacent second permanent magnet, and the outer rotor is accelerated by a repulsive force of the second permanent magnet disposed so that a pole thereof faces the same pole as the first permanent magnet as the inner rotor rotates by a predetermined angle at a preset point when the outer rotor rotates after rotation of the outer rotor is started by the starting device.

In addition, the pedal device may include an operating pedal that is operable by a user by applying an external force, a first power generation gear formed to rotate by the external force applied to the operating pedal, and a second power generation gear formed to rotate by the external force applied to the operating pedal.

Here, the pedal device may further include a variable extension bar provided to connect the operating pedal and a rotating shaft of the first power generation gear and the second power generation gear and formed to have an adjustable length so that a distance between the rotating shaft of the first power generation gear and the second power generation gear and an operation point is adjustable.

In addition, the gear device may include a first mainspring assembly provided to receive a rotational driving force generated by the pedal device and wind and tension a first mainspring, a first reverse rotation unwinding prevention unit that prevents the first mainspring from reversely rotating in a wound state, and a transmission gear array including a plurality of power transmission gears for transmitting a restoring force of the first mainspring to the inner rotor.

In addition, the gear device may further include a first reduction gear formed to share a central rotating shaft of the first mainspring and a second reduction gear formed to share the central rotating shaft of the first mainspring, and in this case, the reduction device may include a first base gear provided to engage with the first power generation gear, a first adjustment gear formed to share a central rotating shaft with the first base gear to form a first reduction ratio by selectively engaging with the first reduction gear, and a second adjustment gear formed to share the central rotating shaft with the first base gear to form a second reduction ratio by selectively engaging with the second reduction gear.

In addition, the reduction device may further include a central shaft that forms a central axis of the first base gear, the first adjustment gear, and the second adjustment gear and is movable up and down with respect to the first base gear, and a gear shift switch that adjusts a height of the central shaft so that the first adjustment gear and the first reduction gear engage or the second adjustment gear and the second reduction gear engage.

Meanwhile, the starting device may include a second mainspring assembly provided to receive a rotational driving force generated by the pedal device and wind and tension a second mainspring, a second reverse rotation unwinding prevention unit that prevents the second mainspring from reversely rotating in a wound state, and a starting gear that transmits a restoring force of the second mainspring to the outer rotor.

In addition, the starting device may include a second base gear formed to share a central rotating shaft of the second mainspring and provided to engage with the second power generation gear, an outer ring gear formed to share the central rotating shaft of the second mainspring and provided to engage with the starting gear, a sub-gear that moves the starting gear to be spaced apart from the outer rotor after the starting gear transmits the restoring force of the second mainspring to the outer rotor, and a ratchet that is caught on the outer ring gear in a state in which the starting gear is moved to be spaced apart from the outer rotor by the sub-gear to fix the outer ring gear so as not to rotate.

Another aspect of the present invention provides a high-efficiency self-generator including a rotating body assembly including an outer rotor that includes a first permanent magnet array including a plurality of first permanent magnets arranged along an arc trajectory with a first diameter with a first central axis as a center point and is formed to be rotatable, and an inner rotor that includes a second permanent magnet array including a plurality of second permanent magnets arranged along a circular trajectory with a second diameter smaller than the first diameter with a second central axis positioned between the first central axis and the outer rotor as a center point and is formed to be rotatable, and a power generation device that is connected to the outer rotor and generates electricity by rotation of the outer rotor, the first permanent magnet array is formed such that the first permanent magnets are arranged so that a polarity of each first permanent magnet is in the same direction as that of another adjacent first permanent magnet and a magnitude of a relative magnetic force exerted on the second permanent magnet gradually increases in a direction opposite to a rotational direction of the outer rotor, and the second permanent magnet array is formed such that the second permanent magnets are alternately arranged so that a polarity of each second permanent magnet is in a direction opposite to that of another adjacent second permanent magnet, and the outer rotor is accelerated by a repulsive force of the second permanent magnet disposed so that a pole thereof faces the same pole as the first permanent magnet as the inner rotor rotates by a predetermined angle at a preset point when the outer rotor rotates.

In this case, the first permanent magnet array may be formed so that a distance between the first permanent magnet and the second permanent magnet gradually decreases or an absolute magnetic force of the first permanent magnet gradually increases in a direction opposite to a rotational direction of the outer rotor.

Alternatively, the high-efficiency self-generator may further include a mainspring assembly including a mainspring provided to be manually or automatically wound and tensioned and a gear assembly that transmits a rotational force of the mainspring to the inner rotor.

In this case, the high-efficiency self-generator may further include a gear control device that periodically intermits operation of the transmission gear array.

In addition, the high-efficiency self-generator may further include a reverse rotation prevention device connected to the first central axis to prevent reverse rotation of the outer rotor.

Advantageous Effects

In a high-efficiency self-generator of the present invention to solve above problems, a pedal device, a gear device, a reduction device, and a starting device are organically connected to each other to form a power transmission structure, so that the high-efficiency self-generator has an advantage of being capable of performing high-efficiency power generation by increasing the rotational acceleration of an outer rotor for generating electricity in a power generation device.

In particular, since the present invention can freely set an operating load of the pedal device through the reduction device, there is an advantage that various users with different physical abilities can conveniently use the pedal device by setting the operating load suitable for the users themselves.

Effects of the present invention are not limited to those mentioned above, and other effects not mentioned will be clearly understood by those skilled in the art from the description of claims.

MODES OF THE INVENTION

Figure 1:
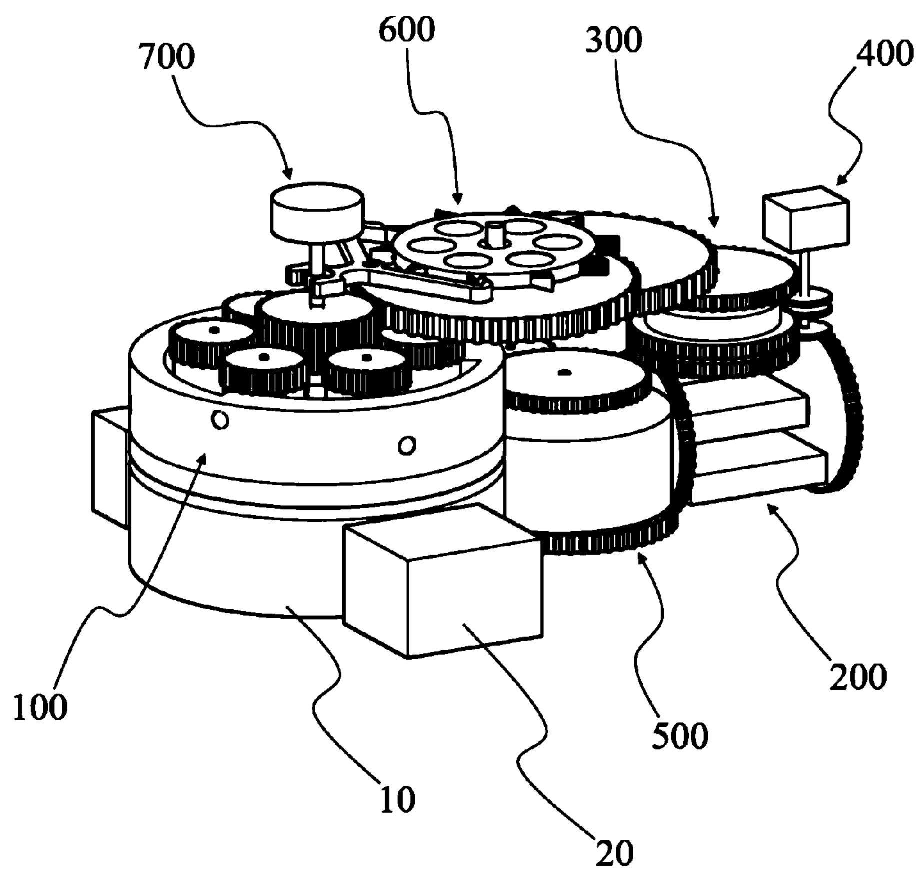
FIG. 1 is a view showing an overall appearance of a high-efficiency self-generator according to one embodiment of the present invention.

In the present specification, when an element (or region, layer, part, or the like) is referred to as being "on," "connected to," or "coupled to" another element, it means that the element can be directly on, connected or coupled to the other element or intervening elements may be present.

Same reference numerals refer to the same elements. In the drawings, the thicknesses, the ratios and the dimensions of the elements are exaggerated for effective description of the technical contents.

"And/or" includes all of one or more combinations that may be defined by related components.

Terms "first", "second", etc., may be used herein to describe various elements, but the elements should not be limited by the terms. These terms are only used to distinguish one element from another element. For example, without departing from the scope of the present invention, a first element could be termed a second element, and similarly, a second element could be termed a first element. The singular forms are intended to include the plural forms as well, unless the context clearly indicates otherwise.

Terms, such as "beneath," "below," "lower," "above," "upper", and the like, may be used to describe the relationship between elements illustrated in the figures. The terms are relative terms and are to be described based on the orientation depicted in the figures.

Unless otherwise defined, all terms (including technical and scientific terms) used herein have the same meaning as commonly understood by one of ordinary skill in the art to which the present invention belongs. Further, terms, such as those defined in commonly used dictionaries, should be interpreted as having a meaning that is consistent with their meaning in the context of the related art and will be explicitly defined here, unless interpreted in an idealized or overly formal sense.

It will be understood that terms "include," "have", or the like are intended to specify the presence of features, integers, steps, operations, elements, components, and/or combinations thereof stated in the specification, but do not preclude the possibility of the presence or addition of one or more other features, integers, steps, operations, elements, components, or combinations thereof in advance.

Hereinafter, embodiments of the present invention will be described in detail with reference to the drawings.

FIG. 1 is a view showing an overall appearance of a high-efficiency self-generator according to one embodiment of the present invention.

As shown in FIG. 1, a high-efficiency crank magnetic generator according to one embodiment of the present invention includes a rotating body assembly 100, a power generation device 10, a gear control device 600, and a reverse rotation prevention device 700.

In addition to the aforementioned devices, the high-efficiency crank magnetic generator according to one embodiment of the present invention further includes a pedal device 200, a gear device 300, a reduction device 400, and a starting device 500.

In addition, the present embodiment may further include a power storage device 20 that stores electricity generated by the power generation device 10.

First, a power generation mechanism through the rotating body assembly 100 will be described.

Figure 2:
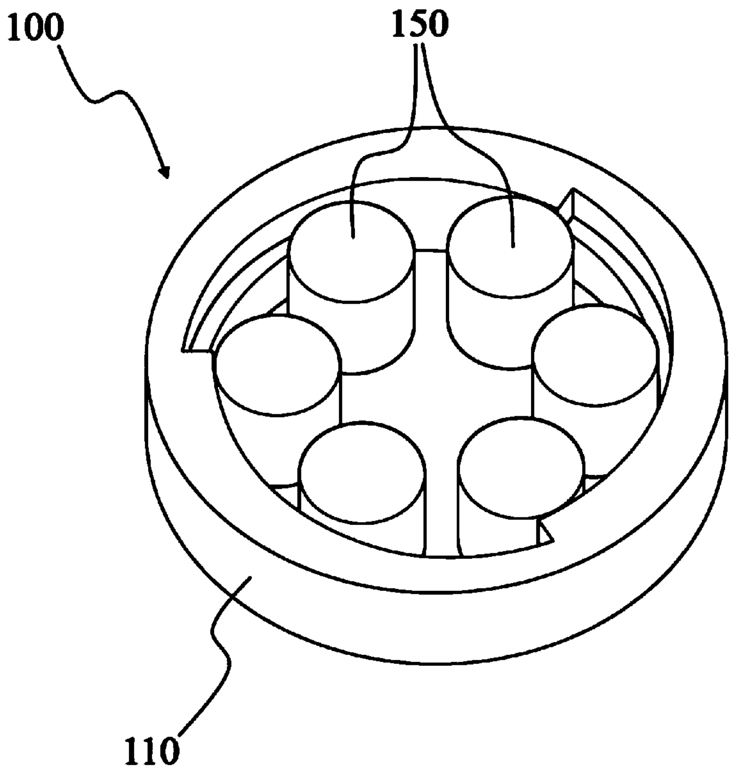
FIG. 2 is a view showing an appearance of a rotating body assembly in the high-efficiency self-generator according to one embodiment of the present invention.
Figure 3:
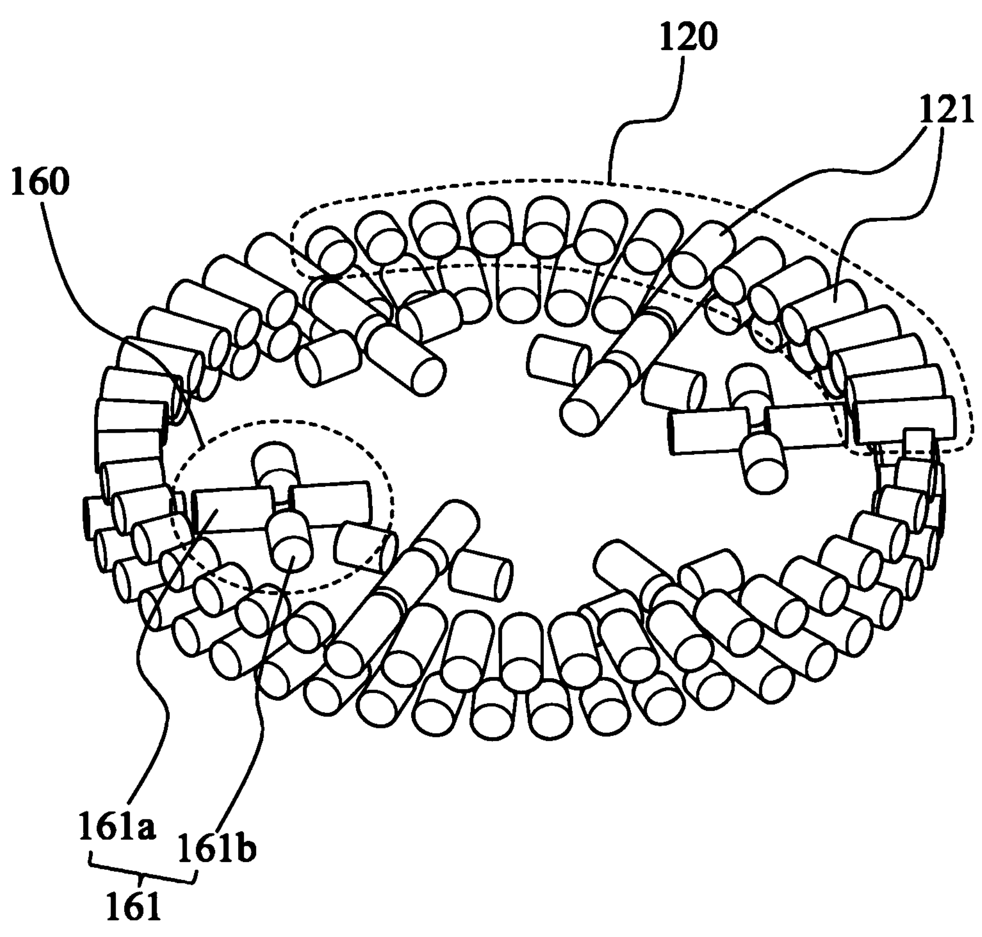
FIGS. 3 and 4 are views showing an internal structure of the rotating body assembly in the high-efficiency self-generator according to one embodiment of the present invention.
Figure 4:
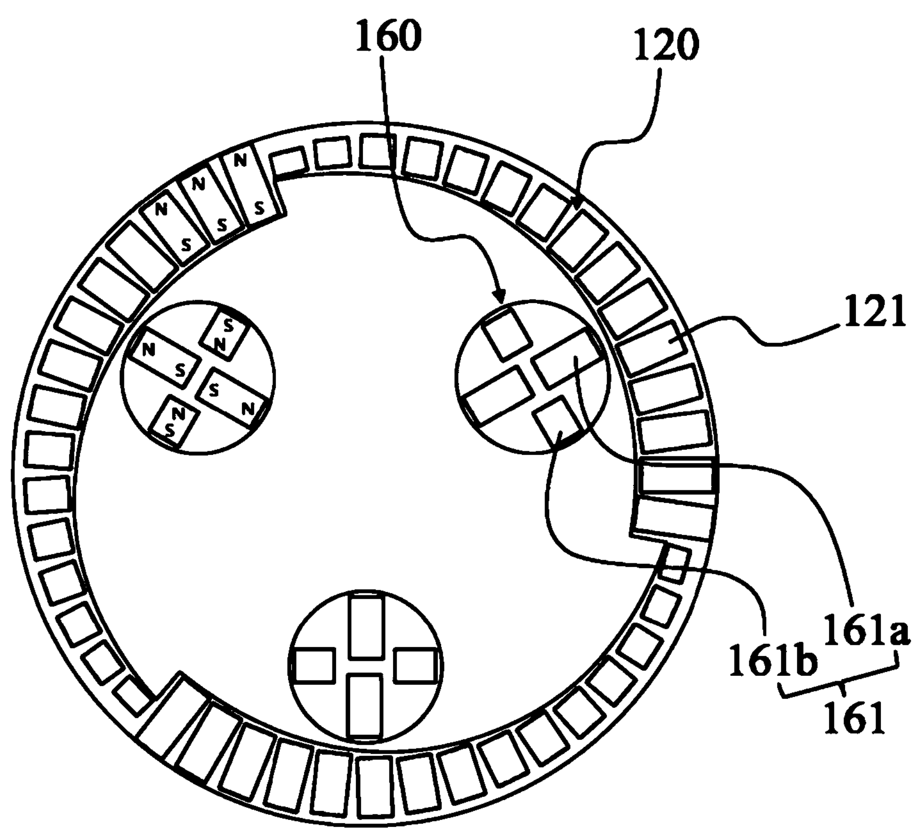

FIG. 2 is a view showing an appearance of the rotating body assembly 100 in the high-efficiency self-generator according to one embodiment of the present invention, and FIGS. 3 and 4 are views showing an internal structure of the rotating body assembly 100 in the high-efficiency self-generator according to one embodiment of the present invention.

As shown in FIGS. 2 to 4, the rotating body assembly 100 includes an outer rotor 110 and an inner rotor 150.

The outer rotor 110 includes a first permanent magnet array 120 including a plurality of first permanent magnets 121 arranged along an arc trajectory with a first diameter with a first central axis as a center point and is formed to be rotatable as a whole about the first central axis.

In addition, the inner rotor 150 includes a second permanent magnet array 160 including a plurality of second permanent magnets 161 arranged along a circular trajectory with a second diameter smaller than the first diameter with a second central axis positioned between the first central axis and the outer rotor 110 as a center point and is formed to be rotatable about the second central axis.

In this case, the first permanent magnet array 120 is arranged so that a polarity of the first permanent magnet 121 is in the same direction as that of another adjacent first permanent magnet 121. That is, the first permanent magnets 121 are arranged so that the same poles face a direction toward the center of the rotating body assembly 100.

In addition, the first permanent magnet 121 provided in the first permanent magnet array 120 is formed so that a relative magnetic force thereof exerted on the second permanent magnet 161 gradually increases in a direction opposite to a rotational direction of the outer rotor 110.

To this end, the first permanent magnet array 120 may be formed so that a separation distance between the first permanent magnet 121 and the second permanent magnet 161 gradually decreases further in the direction opposite to the rotational direction of the outer rotor 110.

Alternatively, the first permanent magnet array 120 may be formed so that the absolute magnetic force of the first permanent magnet 121 gradually increases further in the direction opposite to the rotational direction of the outer rotor 110.

That is, the magnitude of the relative magnetic force of the first permanent magnet 121 provided in the first permanent magnet array 120, which is exerted on the second permanent magnet 161, may gradually increase further in the direction opposite to the rotational direction of the outer rotor 110 through various methods.

In the case of the present embodiment, a method in which the first permanent magnet array 120 is formed so that the separation distance between the first permanent magnet 121 and the second permanent magnet 161 gradually decreases further in the direction opposite to the rotational direction of the outer rotor 110 is applied.

In addition, the second permanent magnet array 160 has an alternate arrangement shape so that a polarity of the second permanent magnet 161 is in a direction opposite to that of another adjacent second permanent magnet 161.

In the present embodiment, the second permanent magnet array 160 includes a pair of 2-1 permanent magnets 161*a* that are formed to have a relatively long length and are disposed in opposite directions based on the center point of the inner rotor 150 and a pair of 2-2 permanent magnets 161*b* that are formed to have a relatively short length, formed at right angles to the 2-1 permanent magnets 161*a* based on the center point of the inner rotor 150, and disposed in directions opposite to each other.

In this case, the 2-1 permanent magnets 161*a* are disposed to face the first permanent magnet 121 with different polarities, and the 2-2 permanent magnets 161*b* are disposed to face the first permanent magnet 121 with the same polarity.

Accordingly, in the present invention, as the inner rotor 150 rotates by a predetermined angle at a preset point when the outer rotor 110 rotates, the outer rotor 110 may be accelerated by a repulsive force of the second permanent magnets 161, that is, the 2-2 permanent magnets 161*b*, which are disposed so that the poles thereof face the same poles of the first permanent magnets 121. A more detailed description thereof will be given below.

Meanwhile, a plurality of first permanent magnet arrays 120 are provided along a circumferential direction of the outer rotor 110, and a plurality of inner rotors 150 are disposed to correspond to the first permanent magnet arrays 120, respectively. That is, the inner rotors 150 may be disposed in the same number as the number of first permanent magnet arrays 120.

In addition, the plurality of first permanent magnet arrays 120 may be provided to form a multi-stage structure such that central angles are offset from each other in the direction of the first central axis. In this case, the plurality of inner rotors 150 may be disposed to correspond to the first permanent magnet arrays 120, respectively.

In the present embodiment, it is assumed that the first permanent magnet array 120 forms two layers, that is, disposed in a two-stage structure, and each layer is provided with three first permanent magnet arrays 120. In addition, a total of six inner rotors 150 are provided spaced apart from each other by a certain central angle based on the first central axis to correspond to a total of six first permanent magnet arrays 120 provided in the outer rotor 110, respectively.

In this case, the second permanent magnet 161 provided inside the inner rotor 150 may be provided to have the same height as the height of the corresponding first permanent magnet array 120.

Figure 5:
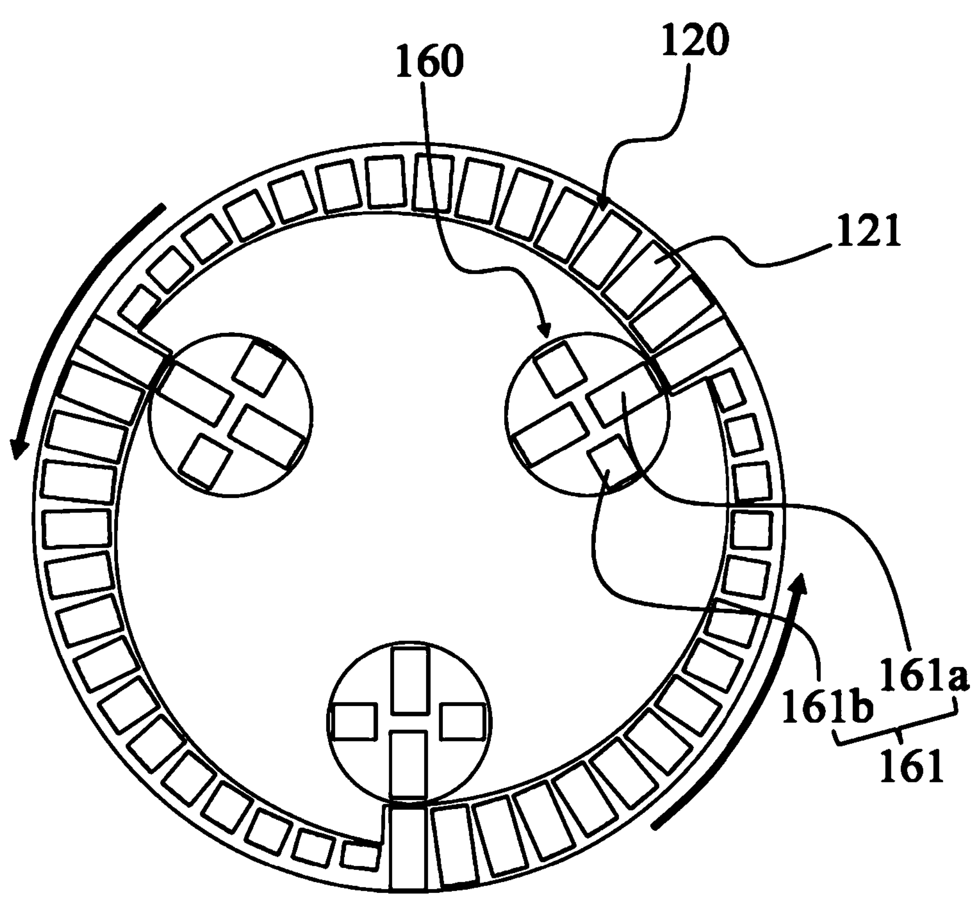
FIGS. 5 to 7 are views showing a driving mechanism of the rotating body assembly in the high-efficiency self-generator according to one embodiment of the present invention.
Figure 6:
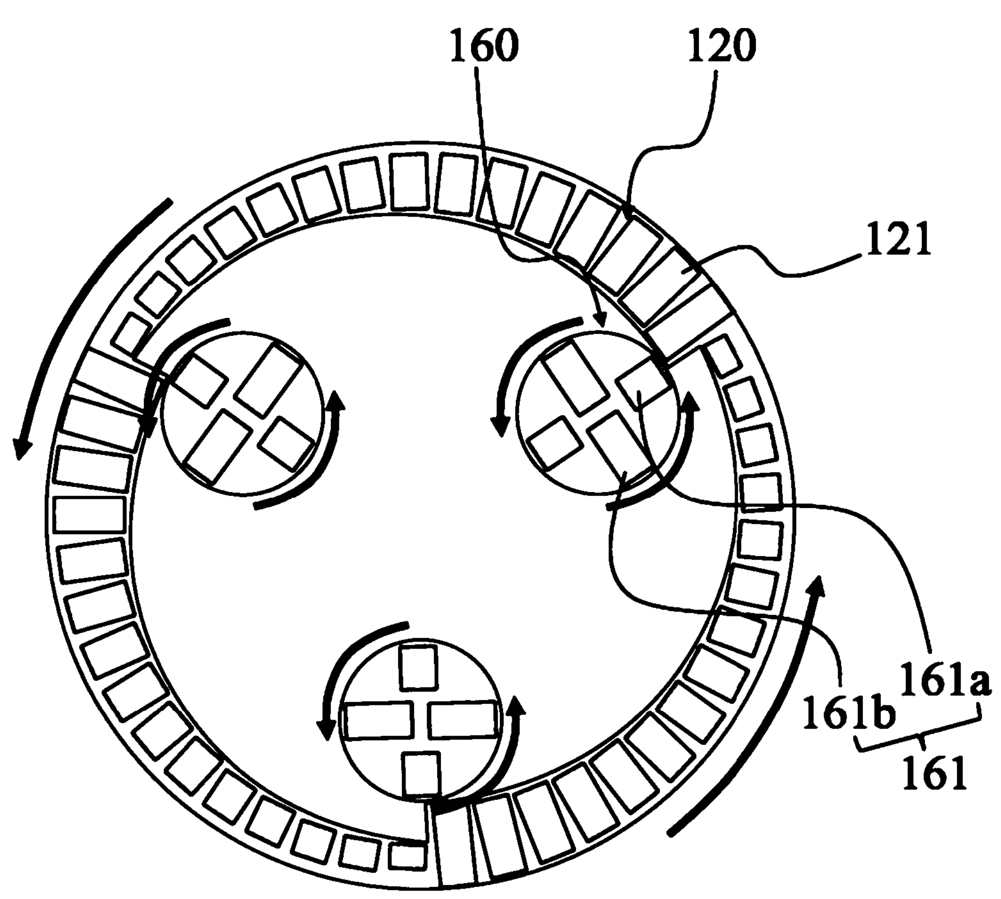
Figure 7:
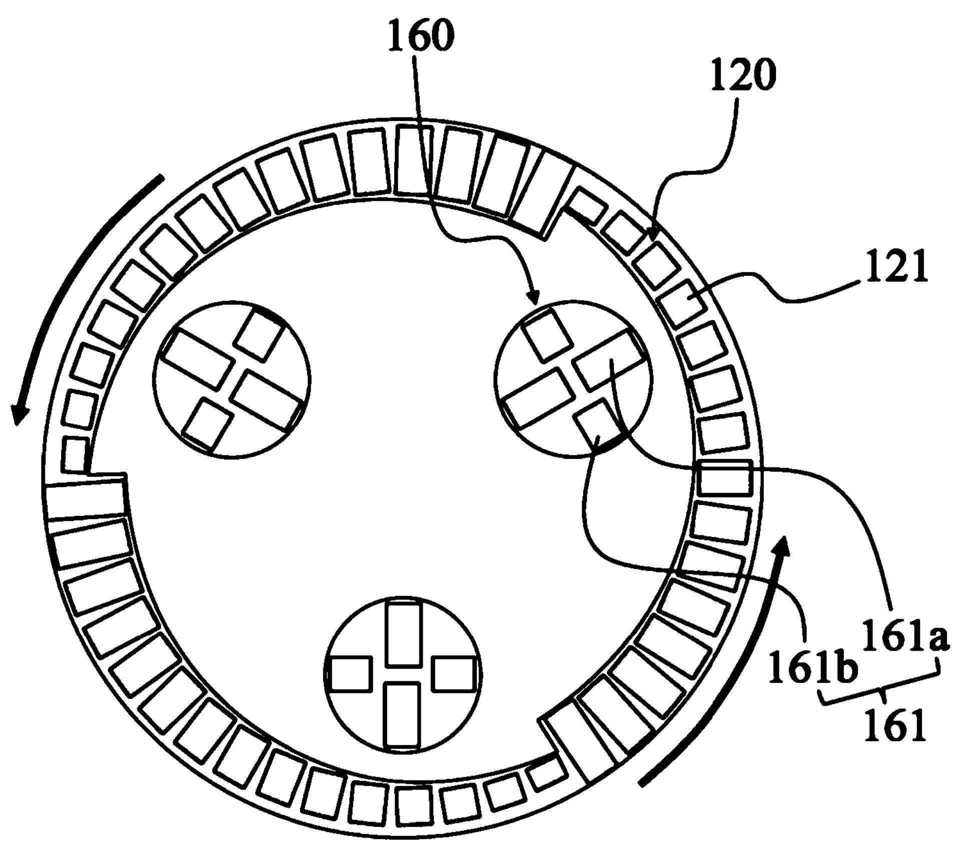

FIGS. 5 to 7 are views showing driving mechanism of the rotating body assembly 100 in the high-efficiency self-generator according to one embodiment of the present invention.

First, as shown in FIG. 5, the outer rotor 110 rotates at an arbitrary position, so that each first permanent magnet array 120 rotates together with the outer rotor 110. At this time, the second permanent magnet 161 facing the first permanent magnet array 120 within the inner rotor 150 is the 2-1 permanent magnet 161*a*.

In the case of the present embodiment, in order to rotate the outer rotor 110 in this way, a starting device 500 (see FIG. 1) for transmitting a rotational driving force to the outer rotor 110 may be provided.

In this process, the plurality of first permanent magnets 121 provided in the first permanent magnet array 120 pass the position of the inner rotor 150 in the order of short length, and thus the length of the first permanent magnets 121 passing through the inner rotor 150 gradually becomes longer.

Therefore, as a distance between the first permanent magnet 121 and the second permanent magnet 161 narrows according to Coulomb's law, the magnetic force between the two magnets gradually becomes stronger.

Then, as shown in FIG. 6, at the moment when the longest first permanent magnet 121 among the plurality of first permanent magnets 121 provided in the first permanent magnet array 120 passes the position of the inner rotor 150, the inner rotor 150 rotates.

In the process in which the inner rotor 150 rotates in this way, the first permanent magnet 121 of the first permanent magnet array 120 receives a repulsive force from the 2-2 permanent magnet 161*b*, thereby accelerating the rotation of the outer rotor 110.

In this case, since the outer rotor 110 rotates due to inertia by the weight of the first permanent magnet 121 inside at the moment when the inner rotor 150 rotates, the inner rotor 150 may rotate without receiving any load.

Then, as shown in FIG. 7, the inner rotor 150 rotates 180° and then stops, and the rotation of the outer rotor 110 is maintained.

In addition, as the distance between the first permanent magnet 121 and the second permanent magnet 161 narrows according to Coulomb's law, the magnetic force between the two magnets gradually becomes stronger and the rotation of the outer rotor 110 gradually becomes faster.

Then, as the process of FIGS. 5 to 7 is repeated, the outer rotor 110 rotates while continuously receiving an acceleration force.

In the present invention, since the first permanent magnets 121 provided in the first permanent magnet array 120 inside the outer rotor 110 may be arranged horizontally and at the same height as a whole in this way, the first permanent magnet array 120 may be configured in a multiple stage in a plurality of layers, and since the inner rotor 150 provided with the second permanent magnet array 160 is provided inside the outer rotor 110, the overall size of the rotating body assembly 100 may be miniaturized and the rotational force may be increased with high efficiency.

Figure 8:
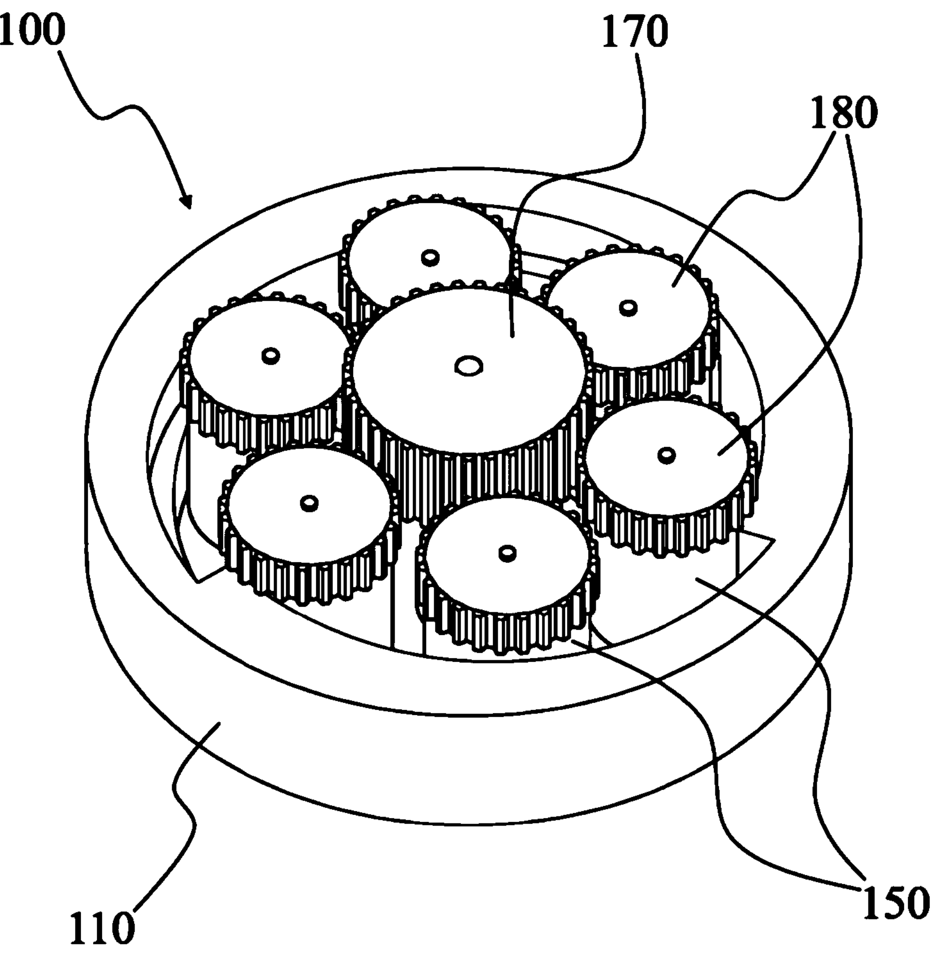
FIG. 8 is a view showing a gear structure of the rotating body assembly in the high-efficiency self-generator according to one embodiment of the present invention.

Meanwhile, FIG. 8 is a view showing a gear structure of the rotating body assembly 100 in the high-efficiency self-generator according to one embodiment of the present invention.

As shown in FIG. 8, in the present embodiment, the rotating body assembly 100 may further include a second rotor gear 180 provided to rotate based on the second central axis in conjunction with each inner rotor 150 and a first rotor gear 170 that engages with the second rotor gear 180 and rotates about the first central axis.

The first rotor gear 170 and the second rotor gear 180 are intended to receive a driving force generated by the pedal device 200, which will be described below, and transmitted through the gear device 300, and may engage with a transmission gear array including a plurality of power transmission gears 320 (see FIG. 8) of the gear device 300, which will be described below.

In the following, the pedal device 200, the gear device 300, the reduction device 400, and the starting device 500 of the present invention will be described in detail.

Figure 9:
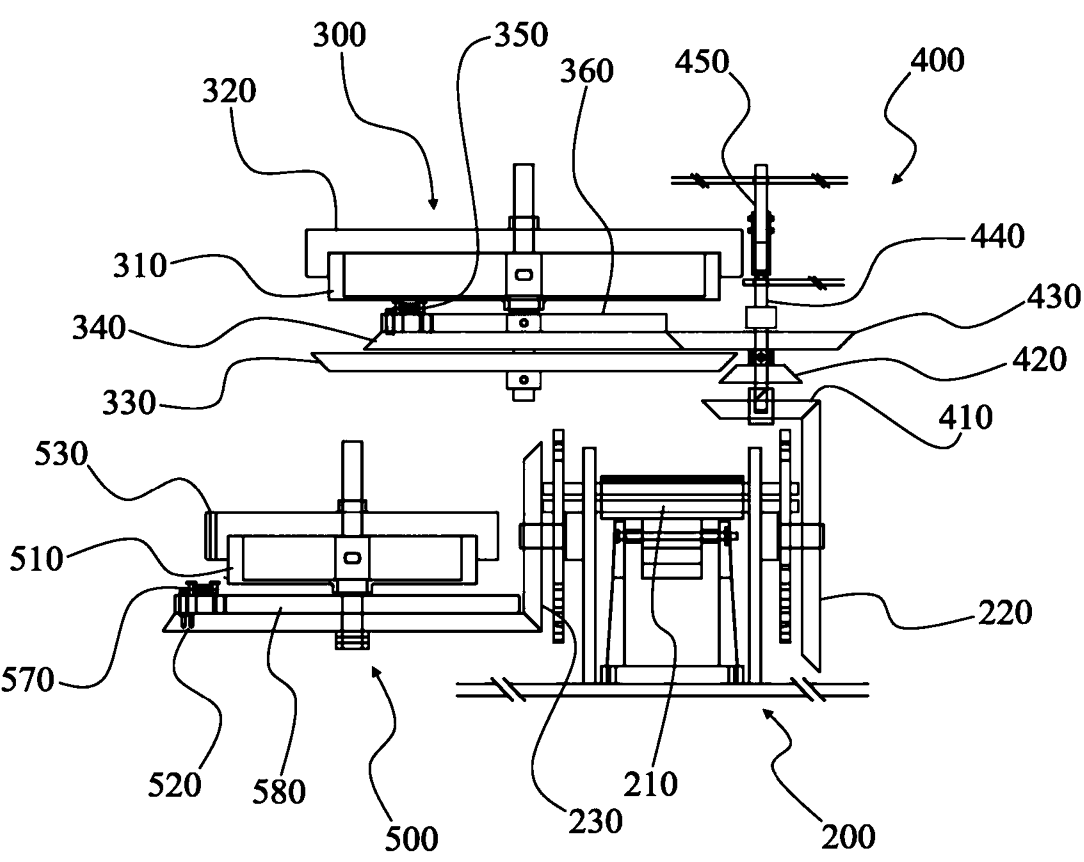
FIG. 9 is a view showing a structure of a pedal device, a gear device, a reduction device, and a starting device of the high-efficiency self-generator according to one embodiment of the present invention.

FIG. 9 is a view showing a structure of the pedal device 200, the gear device 300, the reduction device 400, and the starting device 500 of the high-efficiency self-generator according to one embodiment of the present invention.

The pedal device 200 is a component for converting an external force generated by a user into a rotational driving force.

In addition, the gear device 300 serves to rotate the inner rotor 150 by transmitting the rotational driving force generated by the pedal device 200 to the inner rotor 150 of the rotating body assembly 100.

The reduction device 400 is provided to change a power transmission ratio between the pedal device 200 and the gear device 300.

In addition, the starting device 500 serves to initially rotate the outer rotor 110 by transmitting the rotational driving force generated by the pedal device 200 to the outer rotor 110.

In the following, each configuration will be described in more detail based on FIG. 9, with reference to other drawings.

Figure 10:
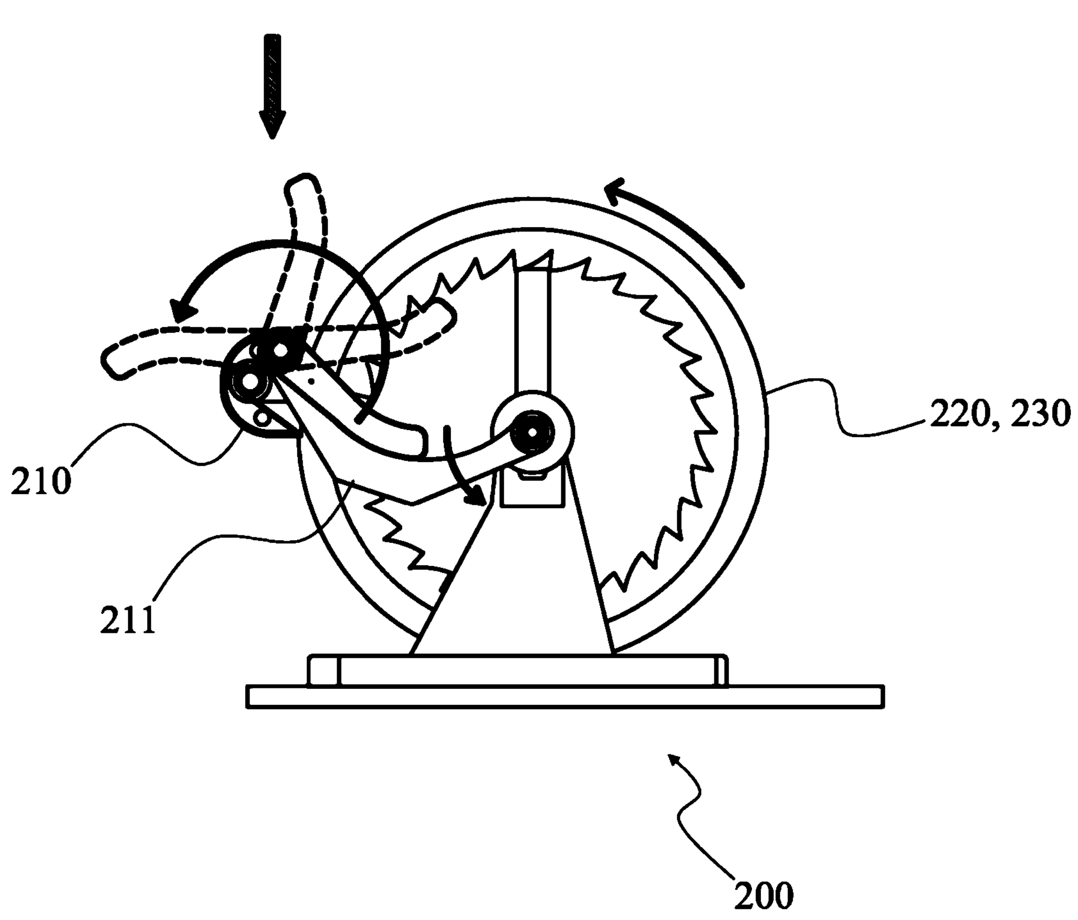
FIG. 10 is a view showing an appearance of the pedal device in the high-efficiency self-generator according to one embodiment of the present invention.

FIG. 10 is a view showing an appearance of the pedal device 200 in the high-efficiency self-generator according to one embodiment of the present invention.

As shown in FIG. 10, in the present embodiment, the pedal device 200 includes an operating pedal 210, a first power generation gear 220, and a second power generation gear 230 in detail.

The operating pedal 210 is provided to be operable by applying an external force by a user. For example, the operating pedal 210 may be provided so that the user may press the operating pedal downward using his or her foot, thereby employing a method of rotating the first power generation gear 220 and the second power generation gear 230 through the external force.

To this end, the pedal device 200 of the present embodiment may further include a variable extension bar 211 connecting the operating pedal 210 and a rotating shaft of the first power generation gear 220 and the second power generation gear 230.

The variable extension bar 211 may be formed to have an adjustable length, and through the adjustable length, a distance between the rotating shaft of the first power generation gear 220 and the second power generation gear 230 and an operation point may be adjusted. Therefore, in the present embodiment, together with the reduction device 400, which will be described below, the intensity of force for operating the operating pedal 210 may be adjusted by the user by the principle of a lever through adjusting the length of the variable extension bar 211.

However, it goes without saying that the method of rotating the first power generation gear 220 and the second power generation gear 230 using the operating pedal 210 may be performed in various ways other than the present embodiment.

The first power generation gear 220 is formed to rotate by the external force applied to the operating pedal 210, and is positioned on one side of the operating pedal 210.

In addition, like the first power generation gear 220, the second power generation gear 230 is formed to rotate by the external force applied to the operating pedal 210, and is positioned on the other side of the operating pedal 210.

Figure 11:
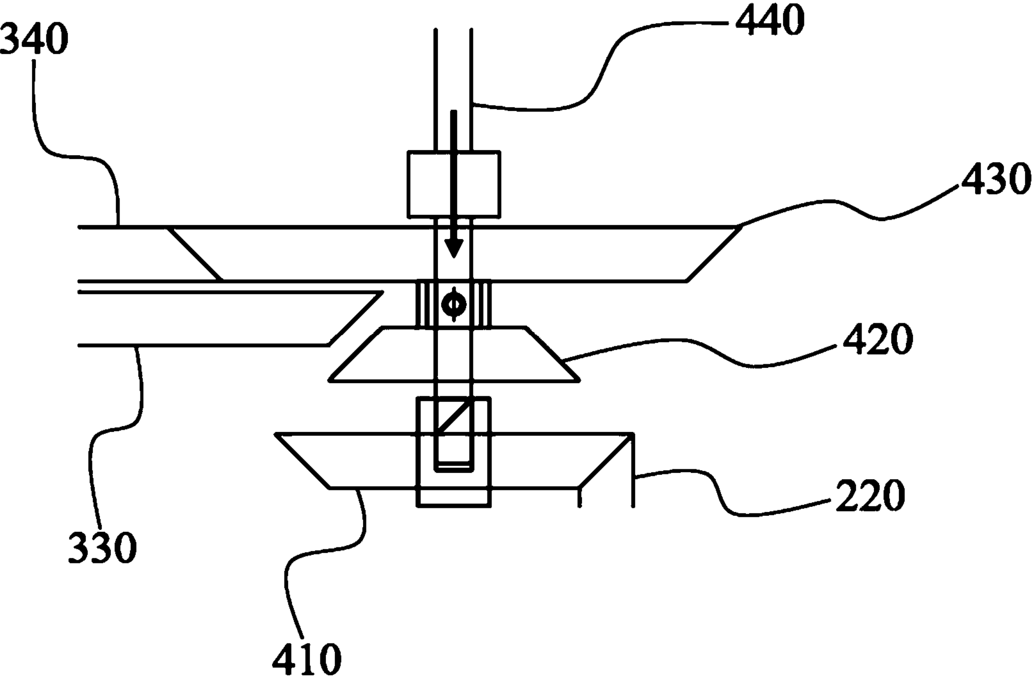
FIGS. 11 and 12 are views showing an example of changing a power transmission ratio through the reduction device in the high-efficiency self-generator according to one embodiment of the present invention.
Figure 12:
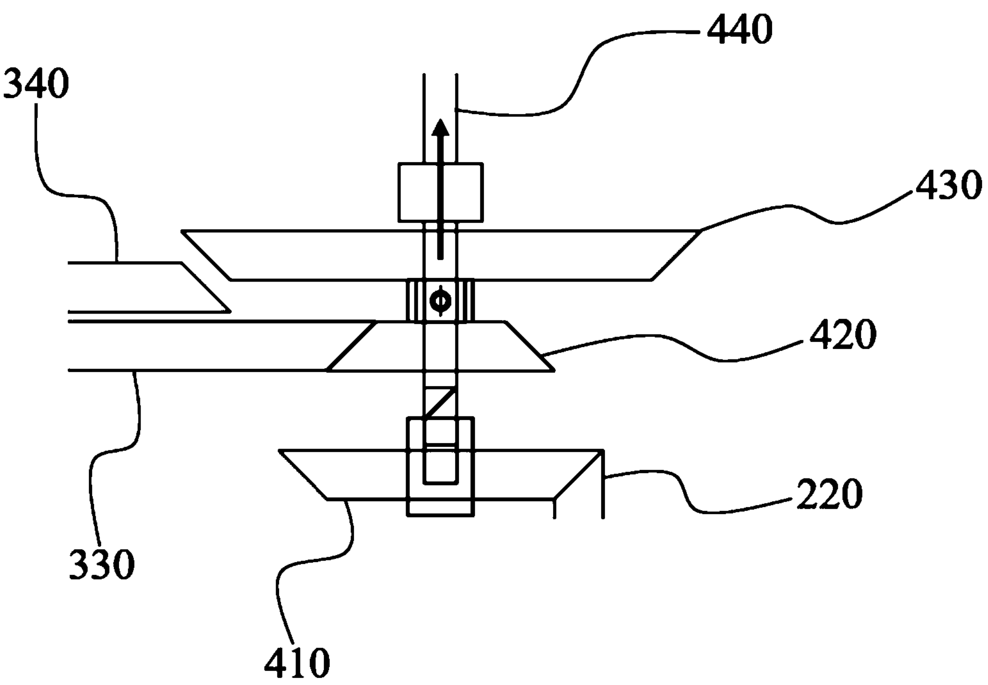

FIGS. 11 and 12 are views showing an example of changing a power transmission ratio through the reduction device 400 in the high-efficiency self-generator according to one embodiment of the present invention.

Referring again to FIG. 9 together with FIGS. 11 and 12, in the present embodiment, the gear device 300 includes a first mainspring assembly 310, a first reverse rotation unwinding prevention unit 350, the transmission gear array, a first reduction gear 330, and a second reduction gear 340.

The first mainspring assembly 310 is provided to receive the rotational driving force generated by the pedal device 200 and wind and tension a first mainspring therein. That is, the first mainspring assembly 310 may generate a driving force through a process in which the first mainspring is restored from a tense state by elasticity.

The first reverse rotation unwinding prevention unit 350 is a component provided to prevent the first mainspring from reversely rotating in a state in which the first mainspring is wound and to provide a driving force in a desired direction, and serves to allow a first reverse rotation prevention gear 360 to rotate only in a forward direction and prevent rotation in a reverse direction on one side of the first reverse rotation prevention gear 360 having a rotating shaft coaxial with the first mainspring.

The transmission gear array includes a plurality of power transmission gears 320 for transmitting a restoring force of the first mainspring to the inner rotor 150. One or more power transmission gears 320 may be provided.

The first reduction gear 330 and the second reduction gear 340 are formed to share the central rotating shaft of the first mainspring. In this case, the first reduction gear 330 and the second reduction gear 340 may have different diameters.

In addition, in the present embodiment, the reduction device 400 includes a first base gear 410, a first adjustment gear 420, a second adjustment gear 430, a central shaft 440, and a gear shift switch 450.

The first base gear 410 may be provided to engage with the first power generation gear 220 of the pedal device 200 to receive a driving force.

In addition, the first adjustment gear 420 is formed to share a central rotating shaft with the first base gear 410 to form a first reduction ratio by being formed to selectively engage with the first reduction gear 330 of the gear device 300.

Furthermore, the second adjustment gear 430 is also formed to share a central rotating shaft with the first base gear 410 to form a second reduction ratio by being formed to selectively engage with the second reduction gear 340 of the gear device 300.

The central shaft 440 may form a common central axis of the first base gear 410, the first adjustment gear 420, and the second adjustment gear 430, and may be formed to be movable up and down with respect to the first base gear 410.

That is, the first adjustment gear 420 and the second adjustment gear 430 may move together with the central shaft 440 when the central shaft 440 moves up and down.

The gear shift switch 450 serves to adjust the height of the central shaft 440 so that the first adjustment gear 420 and the first reduction gear 330 engage or the second adjustment gear 430 and the second reduction gear 340 engage. The gear shift switch 450 may be manually operated by the user, or may be automatically controlled.

Accordingly, as shown in FIGS. 11 and 12, the present invention may selectively allow the first adjustment gear 420 and the first reduction gear 330 to engage, or the second adjustment gear 430 and the second reduction gear 340 to engage through the reduction device 400, thereby transmitting the external force applied through the pedal device 200 at a preset reduction ratio.

For example, the reduction device 400 may be set to a low gear ratio so that weak children or the elderly may generate a driving force with little force, and the reduction device 400 may be set to a high gear ratio so that users with strong strength may generate a large driving force with high efficiency.

Figure 13:
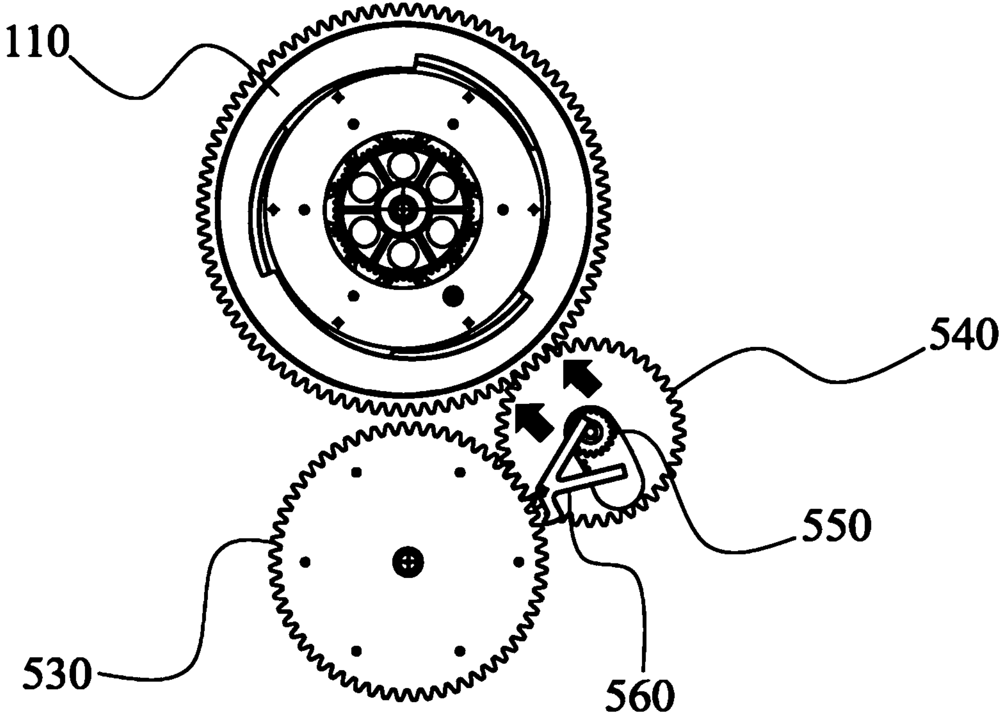
FIGS. 13 and 14 are views showing a mechanism of the starting device in the high-efficiency self-generator according to one embodiment of the present invention.
Figure 14:
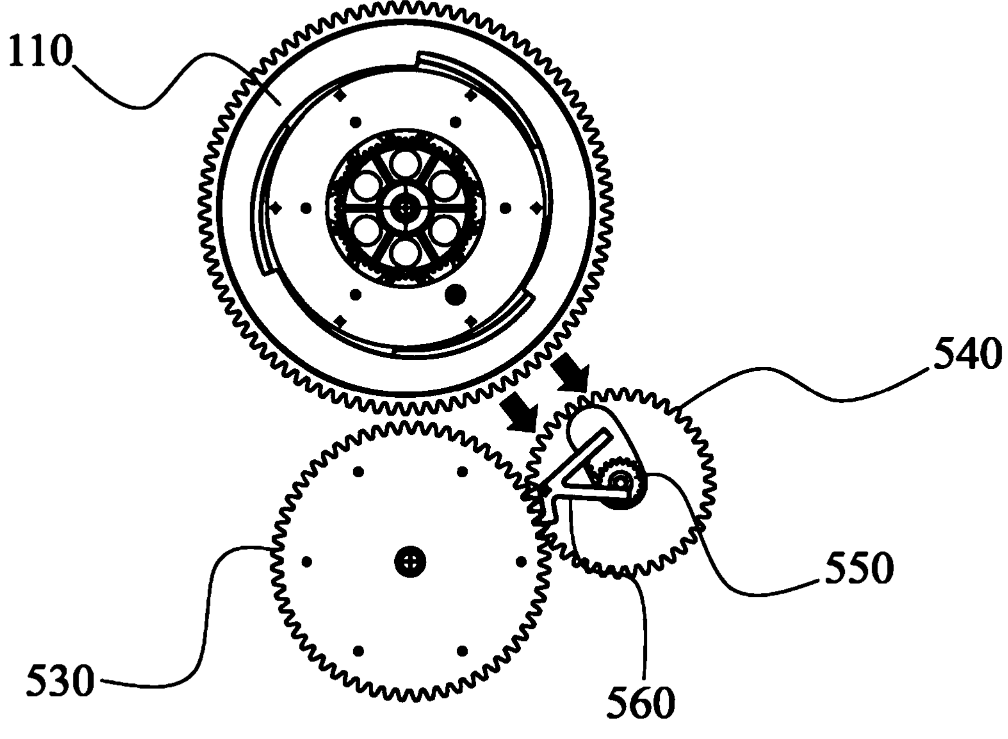

FIGS. 13 and 14 are views showing a mechanism of the starting device 500 in the high-efficiency self-generator according to one embodiment of the present invention.

Referring to FIG. 9 together with FIGS. 13 and 14, in the present embodiment, the starting device 500 includes a second mainspring assembly 510, a second reverse rotation unwinding prevention unit 570, and a second base gear 520, an outer ring gear 530, a starting gear 540, a sub-gear 550, and a ratchet 560.

The second mainspring assembly 510 is provided to receive the rotational driving force generated by the pedal device 200 and wind and tension a second mainspring provided therein. That is, the second mainspring assembly 510 may generate a driving force through a process in which the second mainspring is restored from a tense state by elasticity.

The second reverse rotation unwinding prevention unit 570 is a component provided to prevent the first mainspring from reversely rotating in a state in which the second mainspring is wound and to provide a driving force in a desired direction, and serves to allow a second reverse rotation prevention gear 580 to rotate only in a forward direction and prevent rotation in a reverse direction on one side of the second reverse rotation prevention gear 580 having a rotating shaft coaxial with the second mainspring.

The second base gear 520 may be formed to share the central rotating shaft of the second mainspring, and may be provided to engage with the second power generation gear 230 of the pedal device 200 to receive the driving force.

In addition, the outer ring gear 530 is formed to share the central rotating shaft of the second mainspring and provided to engage with the starting gear 540.

Therefore, the starting gear 540 may transmit a restoring force of the second mainspring to the outer rotor 110 of the rotating body assembly 100.

Meanwhile, in the present invention, the sub-gear 550 is provided to allow the starting gear 540 to engage with the gear formed on the circumference of the outer rotor 110, or to separate the starting gear 540 from the outer rotor 110.

To this end, the sub-gear 550 may engage with gear teeth formed in an inner slit of the starting gear 540 and move the starting gear 540 in a direction closer to or away from the outer rotor 110 as the sub-gear 550 rotates in the forward or reverse direction.

The starting device 500 serves to primarily rotate the outer rotor 110 to initially drive the high-efficiency self-generator of the present invention.

Specifically, when the user generates power using the pedal device 200, the starting device 500 receives the power and moves the starting gear 540 to engage with the outer rotor 110 as shown in FIG. 13.

Accordingly, the outer rotor 110 receives the driving force and rotates, and the power generation process by the permanent magnets described above may be started.

Then, when the restoring force of the second mainspring of the second mainspring assembly 510 becomes weaker than the rotational force of the outer rotor 110, the gear teeth of the outer rotor 110 push the starting gear 540.

Therefore, as shown in FIG. 14, the starting gear 540 is separated from the outer rotor 110, and at this time, the rotating shaft of the sub-gear 550 rotates the ratchet 560, which is rotatably fixed to the starting gear 540 by a separate rotating shaft.

That is, the ratchet 560 is caught on the outer ring gear 530 in a state in which the starting gear 540 is moved to be spaced apart from the outer rotor 110 by the sub-gear 550 to fix the outer ring gear 530 so as not to rotate.

Meanwhile, as described above, the present invention may further include the gear control device 600 that allows the inner rotor 150 to intermittently rotate by periodically intermitting the operation of the gear device 300.

Figure 15:
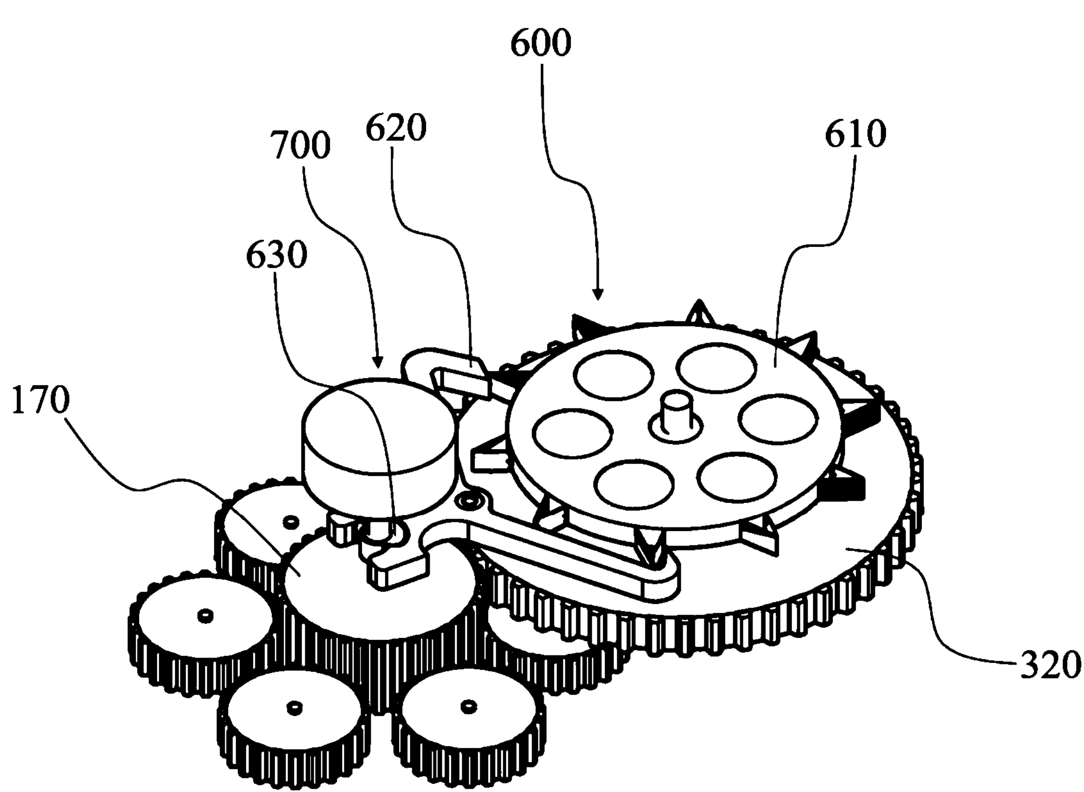
FIG. 15 is a view showing a structure of a gear control device in the high-efficiency self-generator according to one embodiment of the present invention.

FIG. 15 is a view showing a structure of the gear control device 600 in the high-efficiency self-generator according to one embodiment of the present invention.

The gear control device 600 shown in FIG. 15 serves to ensure that the inner rotor 150 intermittently rotates by periodically intermitting the driving of the transmission gear array of the gear device 300.

To this end, the gear control device 600 may include a toothed gear 610 connected to a rotating shaft of any one of the power transmission gears 320 of the transmission gear array and having a plurality of teeth on a circumference thereof, a cam member 630 that is connected to a rotating shaft of the first rotor gear 170 and rotates, and a reciprocating rotating member 620 that intermittently rotates the toothed gear 610 as it reciprocates within a predetermined angle range in a state of being in contact with a curved surface of the cam member 630 during rotation of the cam member 630.

Meanwhile, the present embodiment may further include the reverse rotation prevention device 700 for preventing the outer rotor 110 from reversely rotating by being connected to the rotating shaft of the first rotor gear 170, that is, the first central axis of the outer rotor 110, and the reverse rotation prevention device 700 may be implemented in the form of a one-way bearing or latch.

As described above, the preferred embodiments according to the present invention have been examined, and the fact that the present invention can be embodied in other specific forms in addition to the embodiments described above without departing from the spirit or scope of the present invention is obvious to those skilled in the art. Therefore, the above-described embodiments are to be regarded as illustrative and not restrictive, and accordingly, the present invention is not limited to the above description but may be modified within the scope of the appended claims and their equivalents.

REFERENCE SIGNS LIST

10: Power generation device
20: Power storage device
100: Rotating body assembly
110: Outer rotor
120: First permanent magnet array
121: First permanent magnet
150: Inner rotor
160: Second permanent magnet array
161: Second permanent magnet
161*a*: 2-1 permanent magnet
161*b*: 2-2 permanent magnet
170: First rotor gear
180: Second rotor gear
200: Pedal device
210: Operating pedal
211: Variable extension bar
220: First power generation gear
230: Second power generation gear
300: Gear device
310: First mainspring assembly
320: Power transmission gear
330: First reduction gear
340: Second reduction gear
350: First reverse rotation unwinding prevention unit
360: First reverse rotation prevention gear
400: Reduction device
410: First base gear
420: First adjustment gear
430: Second adjustment gear
440: Central shaft
450: Gear shift switch
500: Starting device
510: Second mainspring assembly
520: Second base gear
530: Outer ring gear

540: Starting gear
550: Sub-gear
560: Ratchet
570: Second reverse rotation unwinding prevention unit
580: Second reverse rotation prevention gear
600: Gear control device
610: Toothed gear
620: Reciprocating rotating member
630: Cam member
700: Reverse rotation prevention device

The invention claimed is:

1. A high-efficiency self-generator comprising:

a rotating body assembly including an outer rotor that is formed to be rotatable with a first central axis as a center point and a plurality of inner rotors that are formed to be rotatable with a second central axis positioned between the first central axis and the outer rotor as a center point;

a power generation device that is connected to the outer rotor and generates electricity by rotation of the outer rotor;

a pedal device configured to convert an external force generated by a user into a rotational driving force;

a gear device configured to rotate the inner rotors by transmitting the rotational driving force generated by the pedal device to the inner rotors;

a reduction device configured to change a power transmission ratio between the pedal device and the gear device;

a starting device configured to rotate the outer rotor by transmitting the rotational driving force generated by the pedal device to the outer rotor; and a gear control device configured to intermittently rotate the inner rotor by periodically intermitting driving of the gear device, wherein the pedal device includes:

an operating pedal that is operable by a user by applying an external force;

a first power generation gear formed to rotate by the external force applied to the operating pedal; and a second power generation gear formed to rotate by the external force applied to the operating pedal, wherein the gear device includes:

a first mainspring assembly provided to receive a rotational driving force generated by the pedal device and wind and tension a first mainspring;

a first reverse rotation unwinding prevention unit that prevents the first mainspring from reversely rotating in a wound state; and a transmission gear array including a plurality of power transmission gears for transmitting a restoring force of the first mainspring to the inner rotor, and wherein the gear device further includes:

a first reduction gear formed to share a central rotating shaft of the first mainspring; and a second reduction gear formed to share the central rotating shaft of the first mainspring, and the reduction device includes:

a first base gear provided to engage with the first power generation gear;

a first adjustment gear formed to share a central rotating shaft with the first base gear to form a first reduction ratio by selectively engaging with the first reduction gear; and a second adjustment gear formed to share the central rotating shaft with the first base gear to form a second reduction ratio by selectively engaging with the second reduction gear.

2. The high-efficiency self-generator of claim 1, wherein the outer rotor includes a first permanent magnet array including a plurality of first permanent magnets arranged along an arc trajectory with a first diameter with the first central axis as a center point, and the inner rotor includes a second permanent magnet array including a plurality of second permanent magnets arranged along a circular trajectory with a second diameter smaller than the first diameter with the second central axis as a center point.

3. The high-efficiency self-generator of claim 2, wherein the first permanent magnet array is formed such that the first permanent magnets are arranged so that a polarity of each first permanent magnet is in the same direction as that of another adjacent first permanent magnet and a magnitude of a relative magnetic force exerted on the second permanent magnet gradually increases in a direction opposite to a rotational direction of the outer rotor, and the second permanent magnet array is formed such that the second permanent magnets are alternately arranged so that a polarity of each second permanent magnet is in a direction opposite to that of another adjacent second permanent magnet, and the outer rotor is accelerated by a repulsive force of the second permanent magnet disposed so that a pole thereof faces the same pole as the first permanent magnet as the inner rotor rotates by a predetermined angle at a preset point when the outer rotor rotates after rotation of the outer rotor is started by the starting device.

4. The high-efficiency self-generator of claim 1, wherein the pedal device further includes a variable extension bar provided to connect the operating pedal and a rotating shaft of the first power generation gear and the second power generation gear and formed to have an adjustable length so that a distance between the rotating shaft of the first power generation gear and the second power generation gear and an operation point is adjustable.

5. The high-efficiency self-generator of claim 1, wherein the reduction device further includes:

a central shaft that forms a central axis of the first base gear, the first adjustment gear, and the second adjustment gear and is movable up and down with respect to the first base gear; and a gear shift switch that adjusts a height of the central shaft so that the first adjustment gear and the first reduction gear engage or the second adjustment gear and the second reduction gear engage.

6. A high-efficiency self-generator comprising:

a rotating body assembly including an outer rotor that is formed to be rotatable with a first central axis as a center point and a plurality of inner rotors that are formed to be rotatable with a second central axis positioned between the first central axis and the outer rotor as a center point;

a power generation device that is connected to the outer rotor and generates electricity by rotation of the outer rotor;

a pedal device configured to convert an external force generated by a user into a rotational driving force;

a gear device configured to rotate the inner rotors by transmitting the rotational driving force generated by the pedal device to the inner rotors;

a reduction device configured to change a power transmission ratio between the pedal device and the gear device;

a starting device configured to rotate the outer rotor by transmitting the rotational driving force generated by the pedal device to the outer rotor; and a gear control device configured to intermittently rotate the inner rotor by periodically intermitting driving of the gear device, wherein the pedal device includes:

an operating pedal that is operable by a user by applying an external force;

a first power generation gear formed to rotate by the external force applied to the operating pedal; and a second power generation gear formed to rotate by the external force applied to the operating pedal, and wherein the starting device includes:

a second mainspring assembly provided to receive a rotational driving force generated by the pedal device and wind and tension a second mainspring;

a second reverse rotation unwinding prevention unit that prevents the second mainspring from reversely rotating in a wound state; and a starting gear that transmits a restoring force of the second mainspring to the outer rotor.

7. The high-efficiency self-generator of claim 6, wherein the starting device includes:

a second base gear formed to share a central rotating shaft of the second mainspring and provided to engage with the second power generation gear;

an outer ring gear formed to share the central rotating shaft of the second mainspring and provided to engage with the starting gear;

a sub-gear that moves the starting gear to be spaced apart from the outer rotor after the starting gear transmits the restoring force of the second mainspring to the outer rotor; and a ratchet that is caught on the outer ring gear in a state in which the starting gear is moved to be spaced apart from the outer rotor by the sub-gear to fix the outer ring gear so as not to rotate.

* * * * *